INVENTOR
George B. Foster,
BY Le Blanc & Shur
ATTORNEYS

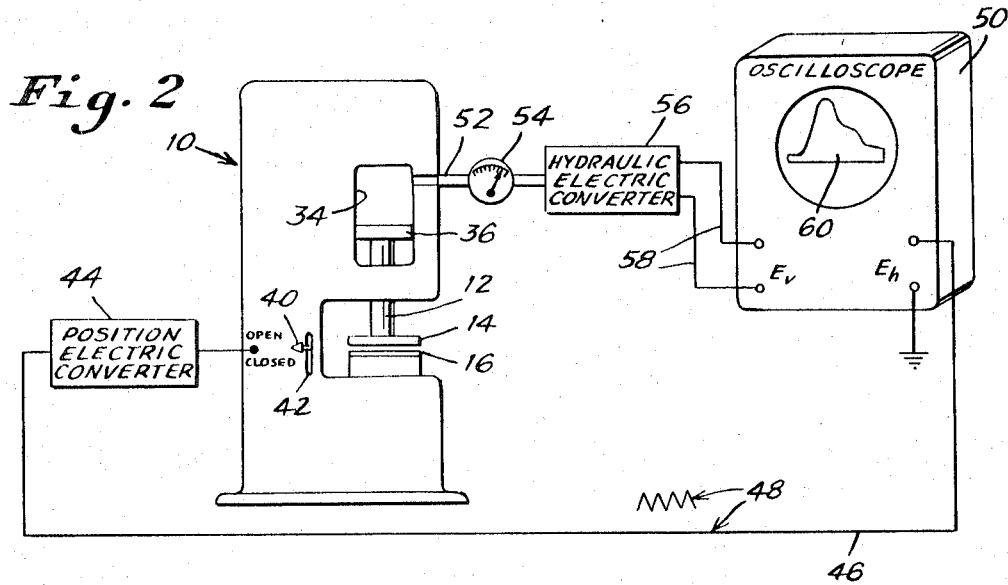
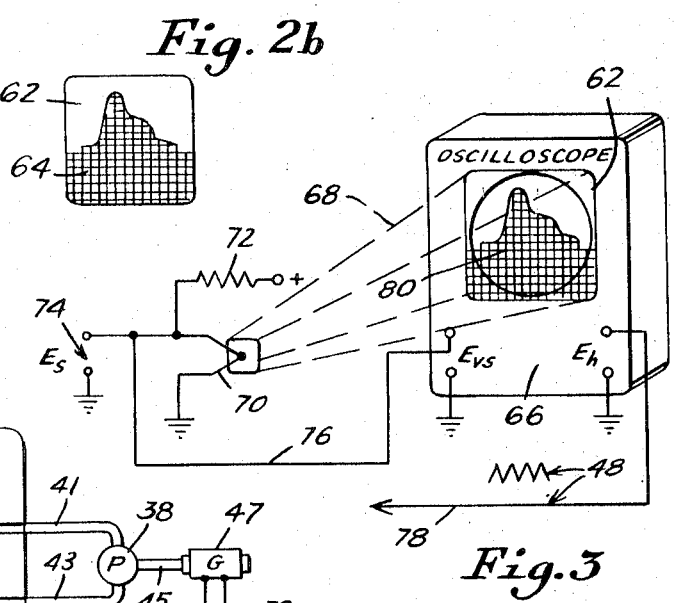
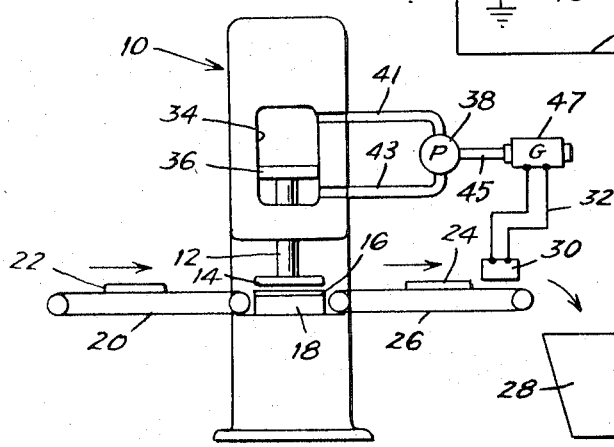

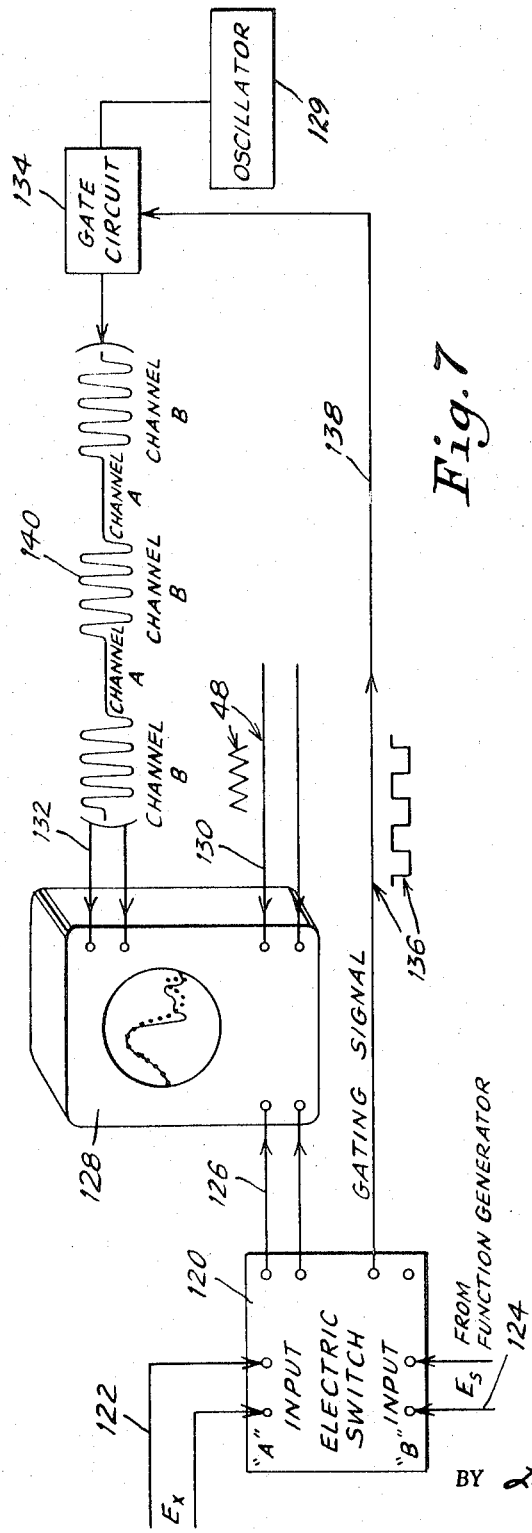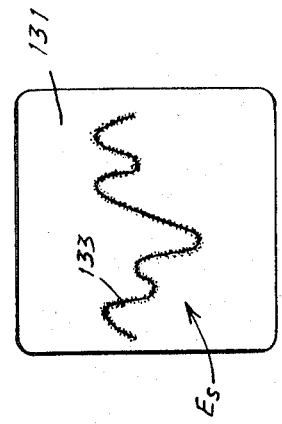

Oct. 17, 1967  G. B. FOSTER  3,348,234
PRODUCTION LINE OPERATION MONITOR AND RECORDER
Original Filed March 20, 1962  7 Sheets-Sheet 4

INVENTOR
George B. Foster,
BY Le Blanc + Shur
ATTORNEYS

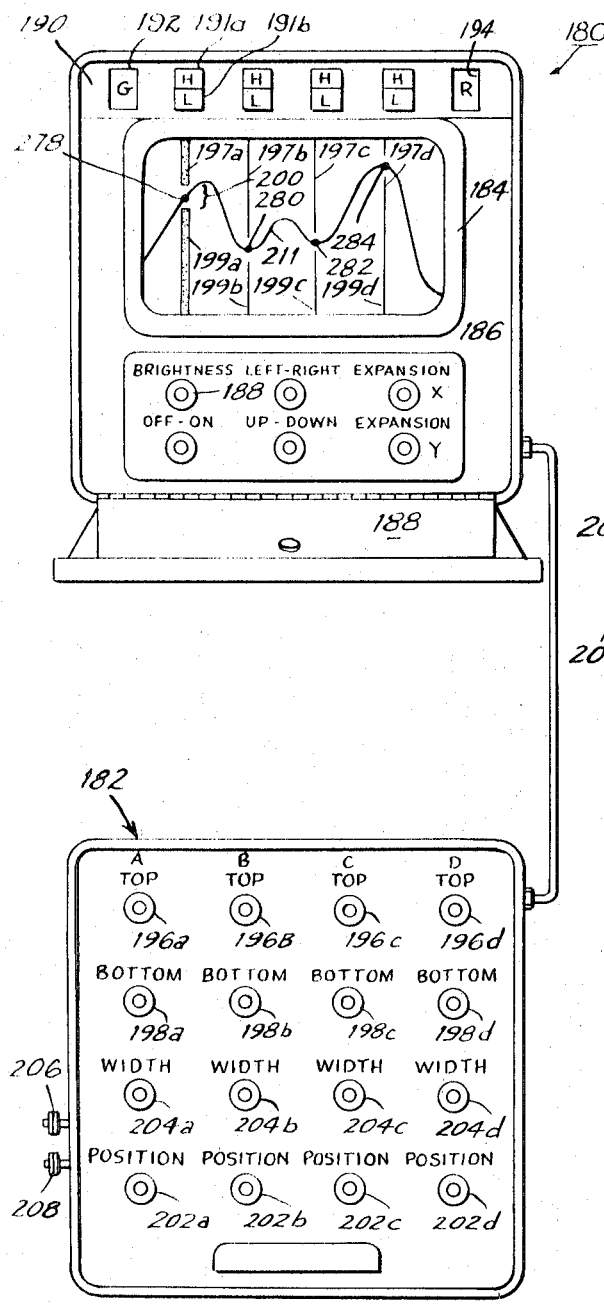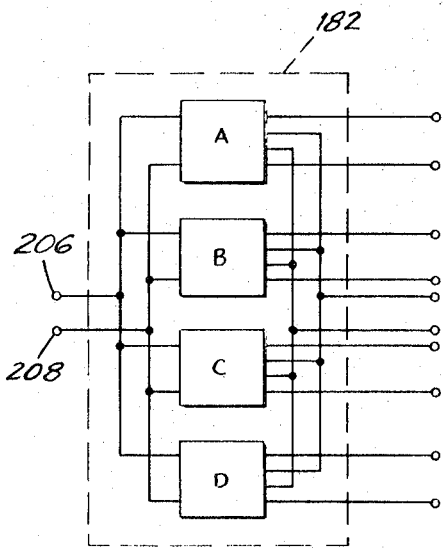

United States Patent Office 3,348,234
Patented Oct. 17, 1967

3,348,234
PRODUCTION LINE OPERATION MONITOR
AND RECORDER
George B. Foster, Worthington, Ohio, assignor, by mesne assignments, to Reliance Electric and Engineering Company, Cleveland, Ohio, a corporation of Ohio
Original application Mar. 20, 1962, Ser. No. 181,009, now Patent No. 3,257,652, dated June 21, 1966. Divided and this application Oct. 22, 1965, Ser. No. 501,917
7 Claims. (Cl. 346—110)

ABSTRACT OF THE DISCLOSURE

A system is described for production line monitoring of a manufacturing process by analysis of at least one machine operating parameter as a function of another machine operating parameter. The system includes transducer means and an associated visual display for producing a record of the functional relationship between the parameters under machine operating conditions producing a satisfactory product. The recorded functional relationship is then compared with the functional relationship between the parameters characteristic of machine operation at some subsequent time to determine departures of operating conditions from those previously established for satisfactory machine performance.

This application is a division of copending application Ser. No. 181,009, filed Mar. 20, 1962, now Patent No. 3,257,652.

This invention relates to an arrangement for monitoring manufacturing operations and more particularly to an electronic monitor for ascertaining the instantaneous relationship between an automatic machine and a work piece.

In many manufacturing and other mass production techniques the continuous monitoring and control of a machine output product is well known. Under certain predetermined conditions of operation of a machine acting on a material with certain physical and chemical properties a satisfactory product can be produced. As the condition of the machine varies and as the physical and chemical properties of the material vary, the output product of the machine will likewise vary. Automatic feedback control arrangements have been used to minimize product variation by performing timely measurements pertinent to the properties of the output product of the machine. The control unit determines the extent to which these measured properties differ from desired standards and signal these differences to automatic feedback control devices capable of making corrective adjustments to the producing machinery with the resulting correction then being incorporated into the machine for subsequent products.

However, variations in the output product do not tell the whole story and in many manufacturing systems there is a need to monitor the overall relationship of the machine to the materials on which the machine is performing some operation to effect a change in the material. This relationship is vital to the qualities of the output product and to proper maintenance of the machine. The present invention provides means for achieving a measurement and also, in certain instances, a pictorial presentation of the relationship of producing machines to the material acted upon so as to provide timely and useful information. The information provided contributes to more effective use of the producing machinery and further provides timely and useful information on the condition of the machinery itself so as to permit adjustments so as to optimize the operating characteristics of the machinery and reduce wear. In extreme instances this information on deviations from a normal range of variability of the producing machine in the form of alarm signals can save the machines from possible damage and breakdown due to such abnormal operating conditions.

It is therefore a primary object of the present invention to provide a system for monitoring the operations of machines.

Another object of the present invention is to provide an electronic system for indicating the relationship between a machine and a work piece or product.

Another object of the present invention is to provide a warning system for automatic machinery indicating excessive variations in machine operation.

Another object of the present invention is to provide an electronic monitoring system for automatic machines which prevents excessive wear and machine breakdown.

Another object of the present invention is to provide a monitoring system for machine operations which provides improved product control.

Another object of the present invention is to provide means for achieving a measurement or a pictorial presentation of the relationship of producing machines to the material acted upon.

Another object of the invention is to provide an improved quantitative measurement or a pictorial presentation of the operation of a producing machine.

Another object of the invention is to provide an improved quantitative measurement or a pictorial presentation of the operation of a producing machine at one or more preselected points in its cycle of operation either as a function of time or independent of time.

It is still a further object of this invention to provide measuring and indicating devices of the foregoing types which are capable of providing alarm signals when certain predetermined minimum or maximum conditions are violated.

It is a still further object of this invention to provide a device for monitoring an operation having a pair of variable parameters, one of which is a function of the other, comprising transducers for providing signals which are functions of such parameters, and including comparator means which have injected thereinto a plurality of signal levels for comparison with the dependent signal under the control of the independent signal, and including indicator means for indicating deviation between the independent signal and the signal levels.

It is another object of the invention to provide an improved device for monitoring an operation having a first variable parameter which is a function of a second variable parameter comprising, first transducer means providing a first electrical signal which is a function of said first parameter and second transducer means providing a second electrical signal which is a function of said second parameter, a plurality of comparator means, means for establishing reference comparison signals in said comparator means for comparison with said first signal, indicating means for indicating deviation between said first signal and said reference comparison signals as compared in said comparator means, and means controlled by said second signal for sequentially rendering said indicator means responsive to said comparator means at instants spaced in a cycle of variation of said first parameter.

These and other objects and advantages of the invention will be more apparent upon reference to the following specification, claims and appended drawings wherein:

FIGURE 1 shows the front view of a hydraulic press machine constructed in accordance with the present invention;

FIGURE 2 is a side view of the press of FIGURE 1 showing one of the electronic machine monitoring systems of the present invention;

Figure 4A:
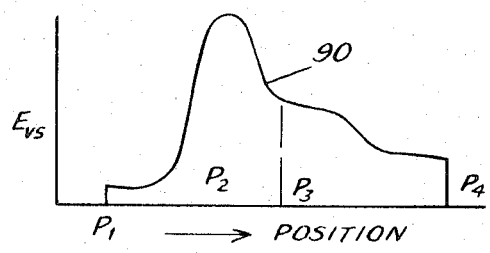
Figure 5A:
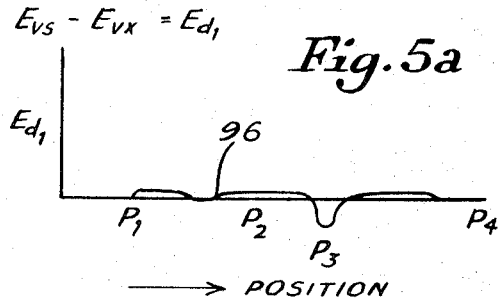
Figure 4B:
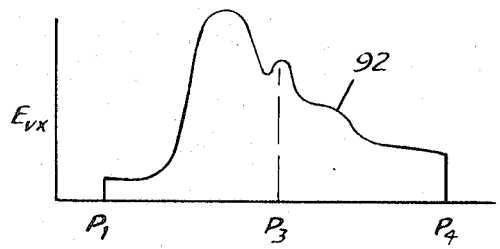
Figure 5B:
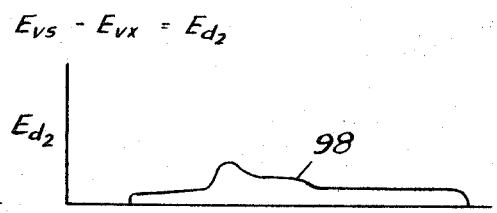
Figure 4C:
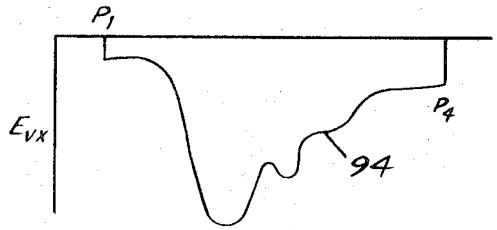
Figure 5C:
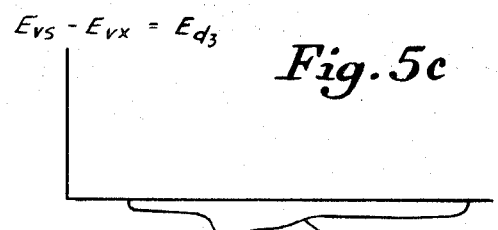
Figure 6:
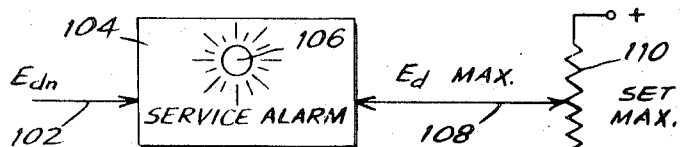
Figure 9:
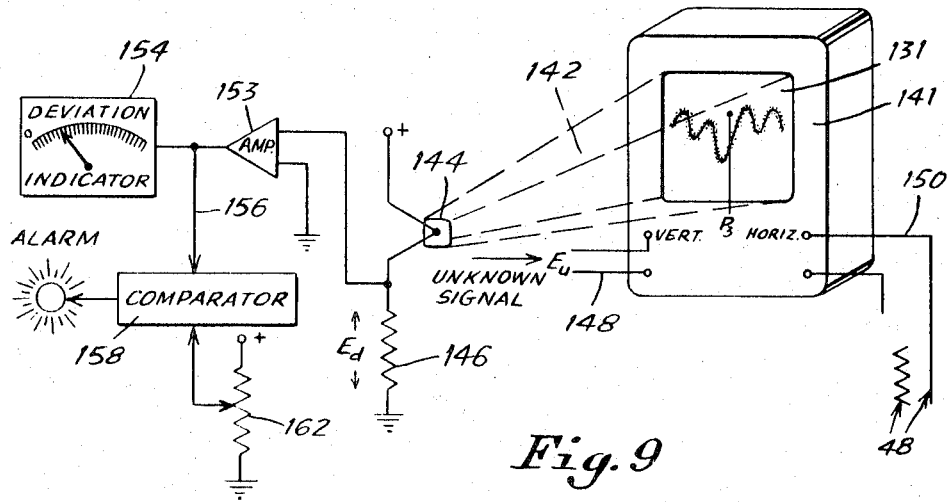
Figure 11:
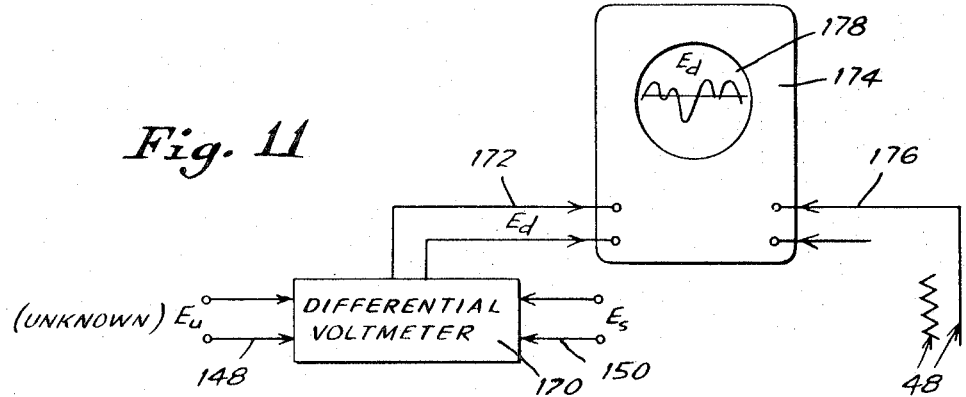
Figure 10:
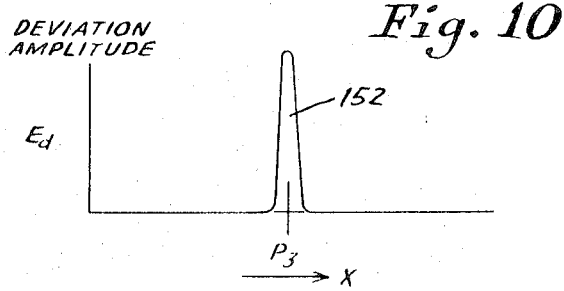
Figure 14:
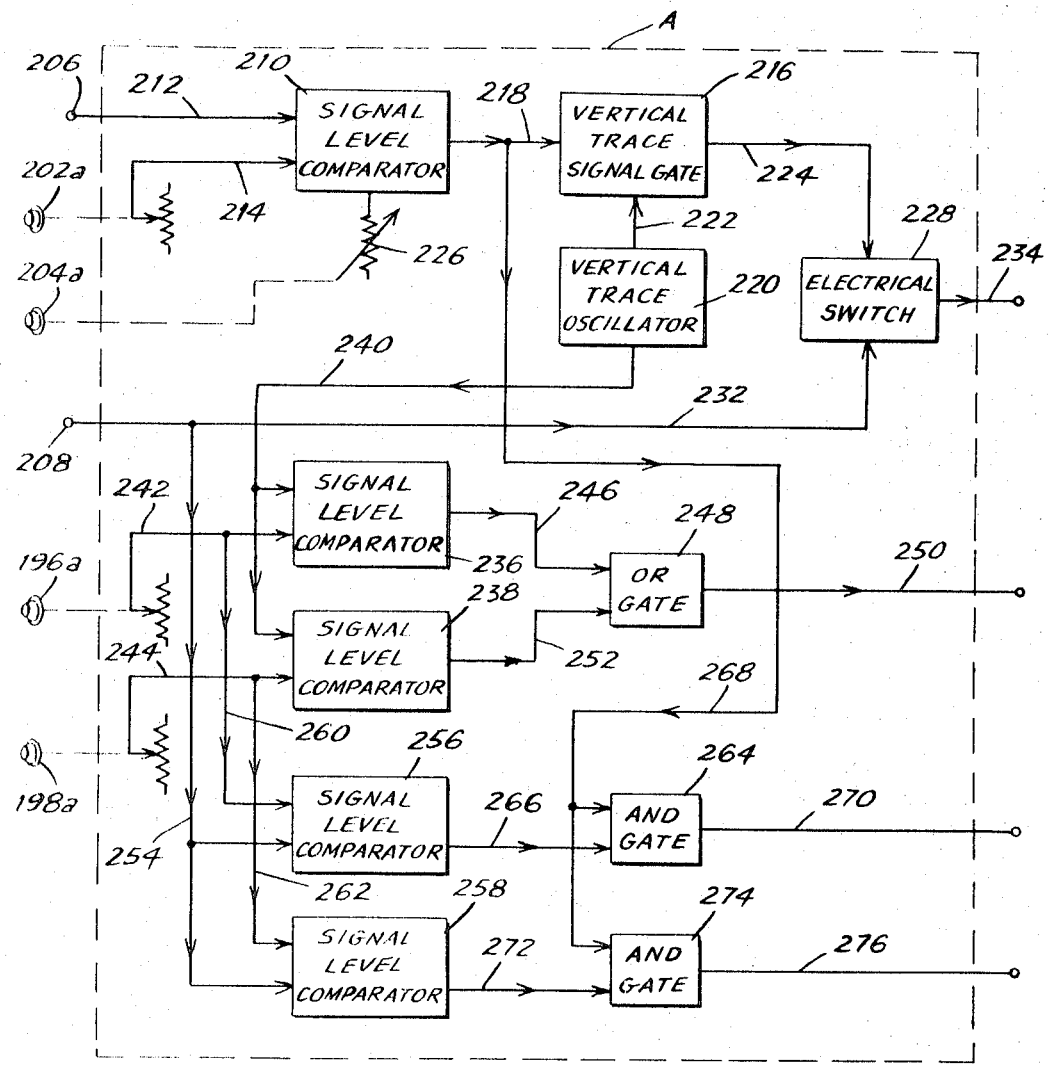

FIGURES 2a and 2b indicate oscilloscope photographic representations obtainable from the circuitry of FIGURE 2;

FIGURE 3 is a zero speed function generator usable in one of the systems of the present invention;

FIGURES 4a through 4c indicate typical function diagrams obtainable with one of the systems of the present invention;

FIGURES 5a through 5c show typical deviation diagrams obtainable with one of the systems of the present invention;

FIGURE 6 shows a simplified alarm system for use with one of the systems of the present invention;

FIGURE 7 shows an oscilloscope circuit for obtaining a visual deviation display in one of the systems of the present invention;

FIGURE 8 shows an oscilloscope mask suitable for use with the deviation monitoring circuitry of one of the systems of the present invention;

FIGURE 8a shows in detail the material enclosed in the circle in FIGURE 8;

FIGURE 9 shows a circuit for the continuous monitoring of a machine-product relationship;

FIGURE 10 shows a diagram of deviation amplitude obtainable with the circuitry of FIGURE 9;

FIGURE 11 shows another circuit arrangement for obtaining a visual deviation display;

FIGURE 12 shows a device constructed according to another embodiment of the invention for presenting and monitoring a machine or process operation in relation to upper and lower limits imposed on predetermined points of a cycle of operation;

FIGURE 13 is a block diagram of the setter unit of the device of FIGURE 12;

FIGURE 14 is a detailed block diagram of the unit A of FIGURE 13, and

FIGURES 15a–15h show the adaptability of the devices of the invention to monitoring and controlling a variety of machine operations and processes.

In many material conversion processes the instantaneous relationship of the material being transformed bears a critical relation to the machine effecting the transformation. One example is the operation of hydraulic presses used to forge or to extrude material into the shape of a die. Such operations are formed on plastic materials as well as many metals. Although the invention will be described as applied to a hydraulic press, it is apparent that it has general utility and may be used in monitoring the automatic operation of all types of machines.

For any given characteristic of raw material introduced into a press operation and for a given set of dies and a given condition of the hydraulic circuits in the press, there is generated a particular relationship of the hydraulic ram pressure versus the ram position as the press closes on the work. This relationship between ram pressure and ram position is utilized in the present invention to give information on the mode of press operation at a given time in comparison with press operation at an earlier time. By obtaining information on the pressure versus position diagram during optimum press operation later deviations from this diagram can be detected and evaluated. These variations can then be used to signal impending faulty operation of the press and the consequent production of an excessive number of out-of-tolerance products. By an analysis of the deviation signal obtained from comparison of the optimum diagram with the faulty diagram, information may be gained upon the nature of the fault causing the change in the later diagram and suitable corrections can be made.

Referring to the drawing, FIGURE 1 shows a hydraulic press generally indicated at 10 having a hydraulic ram 12 carrying an upper press die 14. Lower die 16 rests upon the press block 18. An endless belt 20 carries a plurality of blanks, one of which is indicated at 22, into the press to be operated upon. After the blanks 22 are squeezed between the press dies 16 and 18, the blanks, now in the form of products such as 24, are carried by a second endless belt 26 from the press and fall at the end of the belt into a hopper 28.

The press as illustrated in FIGURE 1 compresses the thicker blanks 22 into thinner products 24. Adjacent the output belt 26 is a suitable thickness sensing device 30 for measuring the thickness of each product 24 issuing from the press. The device 30 may be of any suitable construction and by way of example only may be an electrico-optical circuit for measuring thicknesses. A control signal is developed on output leads 32 when the thickness of the products 24 varies a certain specified amount from the desired output thickness as evidenced by a reference voltage incorporated in the sensing device 30.

Hydraulic press 10 is illustrated as provided with a hydraulic chamber 34 in which reciprocates a piston 36 carried at one end of the ram 12. A hydraulic pump 38 supplies hydraulic fluid by way of lines 41 and 43 to opposite sides of the piston so as to reciprocate the piston in chamber 34 and thereby actuate the ram 12. Pump 38 may be driven by means of a mechanical linkage 45 from generator 47.

As can be seen from FIGURE 1, the sensing device 30 in combination with the generator 47 provides an automatic feedback arrangement to correct for variations in the thickness of the output product. For example, if the hardness of the incoming blanks 22 for some reason increases the resulting output products will evidence an increase in thickness. When the thickness of the output products exceeds a standard permissible deviation, an output control signal from sensor 30 is developed on leads 32 to vary the pump drive. As a result the pressure in chamber 34 driving ram 12 is increased so as to compensate for the increase in hardness of blanks 22 in such a manner as to maintain the thickness of the output products 24 between certain reasonable limits. The arrangement in FIGURE 1 constitutes an automatic feedback control for machines of all types and while illustrated in conjunction with a hydraulic press it is apparent that other types of machines may be similarly controlled and that any of a number of variations in properties may be sensed so that compensation for variances may be provided.

While the system of FIGURE 1 provides product compensation, it provides little or no information with regard to the cause of the product variation nor does it supply any information with regard to the operation of the machine itself. For example, variations in product thickness may result from factors other than faults in the incoming blanks, such as increased friction within the machine, variations in pump operation, and a host of other possible machine faults. Furthermore, it is apparent that an extreme increase in blank hardness may very well result in substantial increases in hydraulic pressure in order to compensate for the increased hardness and maintain constant output thickness. Substantial increases in ram pressure may be undesirable since it may result in excessive machine wear and even in machine breakage. Excessive pressure may rupture the hydraulic lines 41 and 43 or may result in misalignment or breakage of the ram 12.

FIGURE 2 illustrates the same hydraulic press 10 as in FIGURE 1 but represents a side view and illustrates a system for monitoring the relationship between the press operation and the resulting product so as to give an indication of the internal functionings of the ram press. Knowledge of the press operation makes it possible to more accurately control the output product, to reduce excessive wear in the machine and finally to prevent machine breakdown or failure due to excessive variations in operating conditions.

Connected by a suitable linkage (not shown) to the ram 12 internally of the press is an indicator needle 40 which passes over a scale 42 between the extreme open and closed positions of the press. The position of the indicator needle 40 and hence the corresponding position of ram 12 is sensed by a conventional electric converter 44 (such as a position sensitive variable impedance device) to give an output signal on lead 46 representative of the instantaneous position of ram 12. The signal on lead 46 is indicated by way of example only in FIGURE 2 as a saw tooth voltage 48 and is supplied to the horizontal plates of a conventional cathode ray oscilloscope 50.

A pressure line 52 couples the pressure in chamber 34 to a pressure gauge 54 and a hydraulic-electric converter 56. The converter 56 may be any conventional pressure transducer and the output signals on leads 58 from the converter are applied to the vertical deflection plates of oscilloscope 50. The display 60 appearing upon the oscilloscope screen is a curve representing the pressure in chamber 34 of the press as a function of ram position.

FIGURE 2a shows a photograph 62 of the oscilloscope display which shows pressure as a function of position. The photograph 62 is taken of the oscilloscope image in a one-to-one ratio between image size on the face of the tube screen and the photographic emulsion. The developed image is then treated in such a way as to render opaque the film region 64 shown in FIGURE 2b below the line representing the trace on the face of the oscilloscope screen.

The treated film is shown in FIGURE 3 mounted on the face of a function generating oscilloscope 66 where it forms an oscilloscope mask. A light tight shield 68 indicated by dashed lines is affixed to the face of the oscilloscope 66 and terminates in a light sensitive photo conductive diode or photo-conductor 70. In the preferred embodiment the photo-conductor 70 exhibits a resistance rise with decreasing light intensity and is connected in series with a load resistor 72 and suitable potential source. An output voltage $E_s$ is developed across terminals 74. This same voltage is fed back to the vertical deflection plates of oscilloscope 66 by way of lead 76. The horizontal deflection plates of cathode ray oscilloscope 66 are connected by way of lead 78 to the press ram position signal 48. While any reproducible position signal may be utilized, the ram position as indicated in FIGURES 2 and 3 is represented as a simple straight line saw tooth function 48. A suitably synchronized saw tooth generator may be utilized to provide the signal to the horizontal deflection plates of oscilloscope 66.

When the circular spot 80 produced by the cathode ray beam and focused on the flourescent screen of oscilloscope 66 appears above the opaque portion of the mask 62 below the trace of the curve on the film, the photo conductor 70 exhibits a decrease in resistance. Conversely, when the cathode ray spot is masked beneath the curve, the resistance of the photo conductor is increased. These changes in potential drop across photo conductor 70 are fed back to the vertical deflection plates of the cathode ray oscilloscope. In this way the voltage appearing across the photo conductor follows the vertical position of the curve which separates the clear from the masked portion of the film covering the cathode ray tube. The feedback arrangement assures that the spot in sweeping horizontally across the scope will also follow this curve and the voltage appearing at the output terminals 74 in an analogue of the position function of the curve tracked.

The press operation monitor of the present invention works on the principle of comparing two function diagrams relating the hydraulic ram pressure to the hydraulic ram position. The first diagram is obtained during the operation of the press in such a way as to produce good test specimens. The second diagram is any diagram resulting from later strokes of the press during the forming of pieces made to the same specification as the earlier standard piece.

The voltage function corresponding to the master pressure versus position diagram is illustrated at 90 in FIGURE 4a. This voltage function can be obtained from a master mask by means of a function generator of the type illustrated in FIGURE 3. The ordinate $Ev_s$ thus represents the voltage wave form obtained during the operation of the press under the standard satisfactory condition which produced good products. The points labelled P1, P2, P3 and P4 refer to particular position along the travel of the press ram. P4 indicates the closed die position.

FIGURE 4b represents a possible pressure versus position diagram which might be obtained at some later time of press operation. This voltage function too can be derived from a suitable photographic mask used in conjunction with a function generator of the type disclosed in FIGURE 3 or may represent the present output of the same machine taken from the converter 56. The voltage $Ev_x$ thereby represents generally the ram pressure existing during the closure of the die at any later time after the selection of the standard diagram. In the example shown, it will be noted that the function $Ev_x$ versus ram position differs from the function $Ev_s$ particularly at the point $P_3$.

A following operation which may be performed by suitable electrical circuitry is the inversion of the function $Ev_x$ to produce the waveform shown in FIGURE 4c at 94. This function is $-Ev_x$. This operation is performed electrically in order to simplify the algebraic addition of the two quantities $Ev_s$ and $Ev_x$ which will thereby develop information on the difference signal $E_d$.

The information concerning changes in the operation of the press in its relation to the material placed in the dies is in the difference signal $Ed_1$ illustrated at 96 in FIGURE 5a. The difference signal $Ed_1$ contains the intelligence on present deviation of the press diagram from the master diagram. In FIGURE 5a the voltage waveform 96 represents the difference between the waveforms 90 and 92 of FIGURES 4a and 4b respectively. It is noted that the amplitude of the deviation is small at positions $P_1$ and $P_2$ but the amplitude at $P_3$ is relatively large. This corresponds to the aberration seen in FIGURE 4b and FIGURE 4c at the point $P_3$ in the press ram track. Such a sudden increase in ram pressure after the commencement of the deep portion of a draw might signify a misalignment in the die, a foreign material in the die, local hard spots in the blank material or other causes not immediately apparent.

A difference diagram or voltage such as the waveform $Ed_2$ shown at 98 in FIGURE 5b indicates that the master pressure diagram was generally higher throughout the press stroke. Such a condition could have been caused by excessive ductility in the blank material, insufficient thickness of the blank or other causes. The curve $Ed_3$ at 100 in FIGURE 5c might indicate an opposite condition, that is, excessive hardness of the blank or an excessive thickness. It is apparent that it is a relatively simple matter to correlate many of the particular difference patterns with observed material characteristics and defects in end products as well as with various changes in machine operation.

Much signal analysis can be economically performed by oscillograph monitoring of the difference signal $E_d$ for each stroke of the press in large forging press operations. These difference diagrams may be recorded photographically to form a large body of information for later correlation with press problems. According to the invention electronic gating of portions of the difference signal may be used to provide scaler values of the magnitude of the difference signal at critical portions of the pressure versus position diagram. The values at these critical portions can then be applied to comparator circuits which furnish limit alarm signals should the difference in these gated portions exceed preset amounts. Spectral analysis of the difference signal can be used to provide information on the instantaneous deformation and flow characteristics of the metal or other material used in the die cavities.

For simple monitoring of the high speed routine operation of low capacity presses a simple root mean square analysis of the difference signal can be continuously compared with a maximum allowable value of deviation and an alarm provided to signal the imminence of unsatisfactory press operation. FIGURE 6 shows one possible arrangement where the latest value of $Ed_n$ is supplied by line 102 to one side of a comparator alarm 104. The alarm 104 may include a visual indicating device such as lamp 106. The voltage $Ed_n$ is compared to a voltage $Ed_{max}$ which acts as a reference and is supplied to the comparator by way of lead 108 from a potentiometer 110.

Although it is often desirable to compare diagrams obtained during two past periods of machine operation, it is in many instances more important to provide a continuous instantaneous indication of the machine to product relationship. One arrangement for producing the instantaneous comparison of a presently occurring or contemporary signal with a previously derived standard is illustrated in FIGURE 7 where the standard voltage wave $E_s$ from a function generator of the type illustrated in FIGURE 3 is imposed on the vertical input circuit of an oscilloscope in time division with a voltage wave $E_x$ being generated by a contemporary or currently happening phenomenon. The contemporary wave is designated $E_x$ in FIGURE 7 and the standard wave is designated $E_s$. These two signals are applied to the A input and the B input respectively of an electronic switch 120 by way of leads 122 and 124. The output of the electronic switch is supplied by way of leads 126 to the vertical deflection circuit of a presentation oscilloscope 128. The $E_s$ signal is derived from the output terminals 74 of a function generator such as that illustrated in FIGURE 3 and the unknown voltage $E_x$ is that taken from a hydraulic-electric converter such as the output from transducer 56 in FIGURE 2. The ram position signal 48 is connected to the horizontal deflection circuit of oscilloscope 128 by way of leads 130. The two traces representing $E_x$ and $E_s$ are therefore seen simultaneously on the face of the oscilloscope.

An arrangement for distinguishing the two traces, one from the other, includes the application to the Z axis of the oscilloscope of a modulation signal so as to modify the beam intensity during the presentation of one of the channels of the electronic switch. An oscillator 129 at a suitable high frequency selected for intensity modulation supplies intensity modulating signals by way of leads 132 to the Z axis input of the oscilloscope through a suitable gating circuit 134. Gating circuit 134 is rendered alternatively conductive and non-conductive by gating signals 136 passing over lead 138 to the gate circuit from the electronic switch.

A high frequency intensity modulation is applied during that portion of the electronic switch cycle which is presenting the standard signal $E_s$. The intensity modulation is disabled during the portion of the electronic switch cycle which results in the presentation of the unknown signal $E_x$. The modulating signals passing over line 132 are illustrated at 140. In this way the waveform representing $E_s$ is distinguished by a regularly spaced series of bright and dark variations in the cathode ray tube spot intensity.

While the circuit of FIGURE 7 provides for the visual comparison of contemporary and reference signals, FIGURES 8, 9 and 10 illustrate a modified system providing a purely electronic comparison of reference and contemporary signals. In FIGURE 8 the mask 131 constitutes a photographic image modified in such a way as to produce a band 133 representing the $E_s$ voltage which band has a variable optical density about the center value of the curve trace at every point along the curve. In the center of the curve the optical density is sufficient to achieve a virtually complete masking of the cathode ray tube spot. If the spot varies significantly above or below the line of the curve at any point across the face of the cathode ray tube screen then the amount of light escaping from behind this trace becomes greater the more the vertical position of the spot varies from the vertical location of the curve trace. Such a mask can be produced by well known photographic techniques from an oscilloscope screen. Details of the curve are shown in FIGURE 8a wherein the center portion 135 of the curve is completely opaque with the transpaency increasing as the perpendicular direction from the center of the trace increases so as to define a fuzzed area of variable density at 137 and 139 on each side of the trace center line. The amount of light passed by the mask is therefore related to the distance of the spot above or below the centerline of the curve.

In FIGURE 9, the cathode ray oscilloscope 141 has its screen covered with the mask 131 and is enclosed in the light tight hood 142. As before, a photo sensitive diode or other photo conductor 144 is conducted in series with a load resistor 146 between a suitable supply voltage and ground. The unknown voltage $E_u$ is supplied to the vertical deflection plates of the cathode ray oscilloscope by way of leads 148 and the ram position function voltage 48 is supplied to the horizontal deflection plates of cathode ray tube 141 by way of lead 150.

The voltage $E_d$ appearing across load resistor 146 is proportional to the light intensity illuminating the light sensitive element 144 mounted within the hood. At the position $P_3$ along the deviation curve 152 illustrated in FIGURE 10, the cathode ray spot is substantially above the curve trace 132 of the mask. The deviation signals developed across resistor 146 are amplified in an amplifier 153 and supplied to a meter 154 which measures the deviation or difference between $E_s$ and $E_u$. The difference signal may also be passed over lead 156 to a comparator 158 which develops an output voltage to actuate alarm 160. A set maximum allowable deviation may be obtained for one side of the comparator from a reference potentiometer 162.

In FIGURE 11 the unknown voltage on leads 148 is supplied to one side of a differential volt meter 170 while a reference voltage is supplied to the other side on leads 150. The differential output voltage passes by way of leads 172 to the vertical deflection plates of a cathode ray oscilloscope 174. The ram position signal 48 is supplied to the horizontal deflection plates by way of lead 176. The difference voltage is displayed at 178 on the face of the cathode ray oscilloscope for visually monitoring the operation of the machine.

While the embodiments of the invention described in connection with FIGURES 1–11 have been primarily described with instantaneous monitoring, measuring and visual presentation either as a question of exceeding a maximum at any portion of a cycle, or of exceeding a maximum root mean square deviation, it is an important feature of the invention that a unique device and method is provided for providing alarm and record information (either visual or permanent) at preselected critical points in a cycle of machine operation. Referring to FIGURE 12 there is shown a system for performing such a function.

FIGURE 12 shows a possible general mechanical configuration of this apparatus which consists of a display unit 180 and a setter unit 182. These units are shown assembled in separate mechanical housings but obviously may be assembled in a single housing if desired.

The display unit 180 contains an oscilloscope arrangement 184 which is provided with a control panel 186 having mounted thereon the necessary conventional controls for operator adjustment of the trace display. These controls thus relate to the trace brightness, the positioning of the trace and the scale expansion as well as the on-off switch for the unit. A protective spring-hinged cover 188 may be provided to cover the controls when they are not in use.

Also mounted on the display unit 180 is an indicator panel 190 containing limit or indicator lamps. The panel consists of a high (indicated by the letter H) and a low (indicated by the letter L) lamp for each of the four available limit adjustments which are illustrated, it being understood that a larger or smaller number of such limits may be provided. Each limit adjustment is associated with a pair of aligned vertical lines with a dark gap indicative of the tolerance. When the monitored machine is operating within the preset tolerances the trace of a cycle of operation passes through the gaps in the vertical lines. When the display trace impinges upon a vertical line a tolerance has been violated and an appropriate signal light is illuminated. A green summary indicator 192 may be provided and connected to remain illuminated so long as no limits are being violated and, conversely, a red alarm indicator lamp 194 may be provided to become illuminated when a limit is violated, all as will be explained in detail hereinafter.

The setter unit 182 contains the controls for adjusting the trace display, the position of the vertical limit lines along the y function and the vertical positions of the individual limits. There are four vertical columns or knobs indicated by the letter A through D. Each of these columns contains a knob that is labelled "TOP," "BOTTOM," "WIDTH" and "POSITION."

In column A, for example, the top knob 196a controls the extent to which the top vertical trace 197a extends downward from the top of the cathode ray tube of the oscilloscope 180. The position vertically at which the trace 197a is extinguished represents the upper limit of allowable monitor signal excursion without actuating the high limit of that vertical line, column or channel. Likewise, the bottom knob 198a serves to adjust the maximum vertical height of the trace 199a from the bottom of the oscilloscope tube toward the trace 197a at the upper portion of the oscilloscope tube. Adjustment of this knob sets the vertical point at which the lower portion of the vertical trace is extinguished.

The resulting "dark" or "blanked" region 200 between the points where the upper vertical trace 197a and the lower trace 199a are extinguished represents the region of allowable monitored signal amplitude for the particular position along the x axis. The position of the vertical traces along the x axis is also continuously adjustable by means of the position knobs 202a–202d. Likewise, the width of the individual vertical traces is adjustable by means of the width knobs 204a–204d. In FIGURE 12, the first channel is illustrated as having a width adjustment greater than the minimum width.

The manner in which the system shown in FIGURE 12 may be used in place of the operation monitor described in FIGURES 1–11 above may be explained in the following manner. Referring to FIGURE 2, the leads 58 from the pressure transducer 56 are connected to the terminal 206 in FIGURES 12, 13 and 14. In a like manner the lead 46 from the electrical position converter 44 in FIGURE 2 is connected to the terminal 208 in FIGURES 12, 13 and 14. The top and bottom controls of the setter unit 182 are then adjusted so that no vertical traces are present on the display unit. The hydraulic press 10 is then run through a few cycles of normal operation and the electrical waveform 211, which represents the selected function of operation of the press, is observed. Through observation of the waveform which occurs during repeated normal cycles of operation, certain critical cycle points are observed to occur at particular values of the position or x axis. In addition to observation of the x axis position of these critical cycle points it is possible to establish by experience or by trial and error certain y axis (pressure) limits or tolerances at these points. Upon obtaining the foregoing information the next procedure is the setting of the graphic indicators of limit action provided within the instrument.

These graphic indicators consist of the vertical traces 197a–197d and 199a–199d superimposed on the screen representation of the machine cycle. FIGURE 12 shows the general appearance of these limit indicator traces. In the illustration four values of the variable x are available for establishing appropriate allowable levels of y at four selected critical points in the cycle. It is obvious, however, that a greater or lesser number of values of the variable y may be used if desired.

The overall operation of the comparator system can best be understood by referring first to the operation of the setter unit 182 as shown in FIGURES 13 and 14. In FIGURE 13, the setter unit 182 is represented by the dashed line and consists of four vertical trace setting units indicated by the letters A–D. Each of these units controls one of the settings of the vertical traces 197a–197d and 199a–199d appearing on the face of the display unit 180. FIGURE 14 shows in somewhat more detail the construction of one of the units A–D of FIGURE 13. For purposes of explanation, it is assumed that the unit shown in FIGURE 14 is unit A of FIGURE 13. The remaining units B–D are constructed and operated in the same manner as unit A.

As previously described an electrical position signal such as received from the electrical position converter 44 of FIGURE 2 is applied to terminal 206 and the pressure responsive electrical signal, such as produced by the hydraulic electrical converter 56 of FIGURE 2 is applied to terminal 208. The position signal appearing on terminal 206 is connected to a signal level comparator unit 210 by lead 212. Also connected to the comparator 210 by lead 214 is an x axis setting position reference signal which is controlled by adjustments made through the control knob 202a. When the signal appearing on lead 212 is equal in amplitude to the signal appearing on line 214 (within adjustable limits), an output signal is produced on line 218 by the comparator circuit 210. A width control 226 is provided in comparator 210 so that, at one extreme, the comparator provides an output only when the input voltages are exactly equal, whereas on the other extreme the comparator provides an output when the input voltages are equal within a predetermined percentage.

The output signal from circuit 210 is applied to a vertical trace signal gate 216 by the lead 218. A second signal from a vertical trace oscillator 220 is also applied to the gate 216 by a lead 222. Thus, when a gating signal is present on the lead 218, the signal from the oscillator 220 appears on the output lead 224. This output signal appearing on lead 224 is applied to an electrical switch 288. The pressure responsive signal applied to terminal 208 is also connected to the switch 228 by lead 232. The switch circuit 228 is so constructed that the signal appearing on lead 224 will pass through and appear on the output lead 234. Only if no signal is present on lead 224 will the signal appearing on line 232 pass through the switch and appear on the lead 234. The lead 234 is connected to the vertical deflection plates of display unit 180 (FIGURE 12).

Considering only the unit A of FIGURES 13 and 14, since an output from vertical trace oscillator 220 appears on line 224 only when the voltage on terminal 206 is equal to the reference or set voltage on lead 214 (assuming minimum width adjustment at 226), a vertical line will appear once per cycle of the position voltage on terminal 206 at an x axis position determined by the setting of control 202a. At all other times during each cycle the pressure trace is reproduced through electronic switch 228.

Blanking of this vertical signal trace so that the dark or blanked region 200 (FIGURE 12) will be formed is accomplished by taking an output signal from the oscillator 220 and applying it to signal level comparators 236 and 238 through a lead 240. A second signal is applied to each of the comparators 236 and 238 by leads 242 and 244, respectively. The signals appearing on leads 242 and 244 are variable by means of the control knobs 196a and 198a respectively.

The signal level comparator 236 is so constructed that whenever the vertical trace oscillator signal (which is represented as a sawtooth wave) is of an amplitude which is above or greater than that appearing on the reference signal lead 242, a signal will be produced on the output lead 246.

The output signal appearing on lead 246 is applied to an OR gate circuit 248 which is so constructed as to pass the signal through to an output lead 250. This output lead 250 is connected to the Z axis blanking circuit of the oscilloscope of display unit 180 (FIGURE 12) and as long as the signal is present on the lead, the vertical trace applied to unit 180 by lead 234 will not be blanked.

The signal level comparator 238 operates conversely to comparator 236. As long as the sawtooth wave from the oscillator 220 is lower in value than the reference signal applied to lead 244, an output signal will be produced and applied by lead 252 to the gate 248. The gate 248 will pass the signal from lead 252 to lead 250. The presence of this signal on lead 250 prevents the vertical trace signal applied by lead 234 to the display unit 180 from being blanked. Thus, so long as a signal appears on line 250 the signal on line 234 will not be blanked through the action of the Z axis control of the oscilloscope. However, when the signal disappears from line 250 Z axis blanking occurs. This means that when the position voltage on terminal 206 equals the set voltage on line 214 to comparator 210, a vertical trace begins to appear on the oscilloscope. The visual height of this vertical trace increases until the amplitude of the vertical trace oscillator signal on line 240 exceeds the reference voltage applied by lead 244 to comparator 238. When this level is exceeded no signal emanates from comparator 238. At the same time no signal is emanating from comparator 236 because the level of the oscillator signal on line 240 is below the reference level applied to comparator 236 on line 242. Blanking continues until the level of the oscillator signal on line 240 exceeds the level on line 242 and a signal appears on line 246 to OR gate 248. The vertical trace then again becomes visual after leaving a vertical dark space having a vertical dimension proportional to the permissive tolerances at this point in the cycle of operation. It will thus be appreciated that adjustment of control 198a adjusts the lower limit while adjustment of control 196a adjusts the upper limit for the single vertical trace appearing at an $x$ axis position controlled by control 202a.

Of course, this blanking unit could operate in other ways. For example, the unit could be constructed so that if the vertical trace signal is below the reference signal appearing on lead 244, then the combination of these would produce an output signal from both the circuits 236 and 238. The signals thus produced would be fed to an "AND" gate and result in a blanking voltage being applied to the display unit 180. Other suitable arrangements will be readily apparent to those skilled in the art.

The operation of the alarm circuit associated with the same vertical trace involves a somewhat similar system. Thus the pressure responsive signal applied to terminal 208 is connected through a lead 254 to a pair of signal level comparators 256 and 258. The variable reference signals appearing on leads 242 and 244 are also connected to the comparators 256 and 258 by leads 260 and 262, respectively.

The signal level comparator 256 is constructed so that whenever the signal applied to terminal 208 is greater than the reference signal on lead 260, an output signal is produced. This output signal is connected to an "AND" gate 264 by a lead 266. The other input lead 268 of the "AND" gate 264 is connected to the output of the signal level comparator 210. If a signal appears on both the leads 266 and 268 simultaneously, an output signal is produced on lead 270. This lead is in turn connected to an alarm circuit such as the H light 191a on panel 190 of the display unit 180 (FIGURE 12).

If the input signal applied to terminal 208 falls below the reference level appearing on line 262, the signal level comparator circuit 258 will produce an output signal. This output signal is connected by lead 272 to an "AND" gate 274. The other input to this gate 274 is connected to the lead 268 of the signal comparator circuit 210. If both leads 268 and 272 have a signal present thereon at the same time, an output signal is produced by the AND gate 274. This output signal is applied over lead 276 to an alarm circuit such as the L light 191b of the panel 190 (FIGURE 12).

Thus, when the vertical trace is produced by reason of the coincidence of the position voltage appearing on terminal 206 and the set or reference voltage on lead 214, the upper limit light will be illuminated if the upper limit is exceeded and the lower limit light will be illuminated if the lower limit is exceeded. Suitable audible alarms and light holding or recording devices may of course be provided. If one is observing the signal trace as it passes through the dark tolerance gap of the vertical line, no alarm is created so long as the upper and lower extremities of the line are not traversed. If the signal trace intersects either extremity, however, the appropriate alarm is energized.

In considering the operation of the overall system, let it be assumed that the trace 211 appearing on the face of the display unit 180 represents the desired value of the function $x$ versus $y$ during an operating cycle of press 10. Furthermore, let it be assumed that the pressures at the $x$ axis positions represented by points 278-284 are critical in the operating cycle of the press 10. Thus, these points are the ones that will be monitored or checked during the press cycle.

To adjust the setter unit 182 for monitoring or checking the press cycle, the position control knob 202a is adjusted until the vertical trace 197a–199a is lined up with the critical point 278. The upper and lower limit knobs 196a and 198a are then adjusted until the desired amount of the vertical trace 197a–199a is blanked out. This blanked out portion is represented at the space 200 and represents the amount of the pressure variation or tolerance allowable at this point in the press cycle. As can be seen, the amount of tolerance allowable may be adjusted to meet the needs of the operation.

The width knob 204a is then adjusted to vary the width of this vertical trace. This sometimes is desirable since, by so adjusting the width, the time during which the alarm system is responsive may be extended. The above recited operation steps are again repeated until all the various vertical traces have been properly adjusted.

As long as the signal trace 211 passes through the blanked area 200, which is the tolerance allowance within this portion of the operation, the operation of the press is correct. Should the force of the press change, the trace 211 will move from its normal position and, should this movement exceed the tolerance as represented by area 200, the trace 211 will cross the vertical trace 197a and the appropriate alarm light 191a or 191b will flash on indicating a correction is necessary. The operating cycle of the press may thus be monitored, thereby allowing the operator to make any corrections that may be necessary before damage or failure to the machine occurs.

While the operation of this device has been described in connection with a hydraulic press this has been by way of illustration only and almost limitless application is possible to almost any type of machine or process. FIGURES 15A–15H show a number of these processes.

Figure 15:
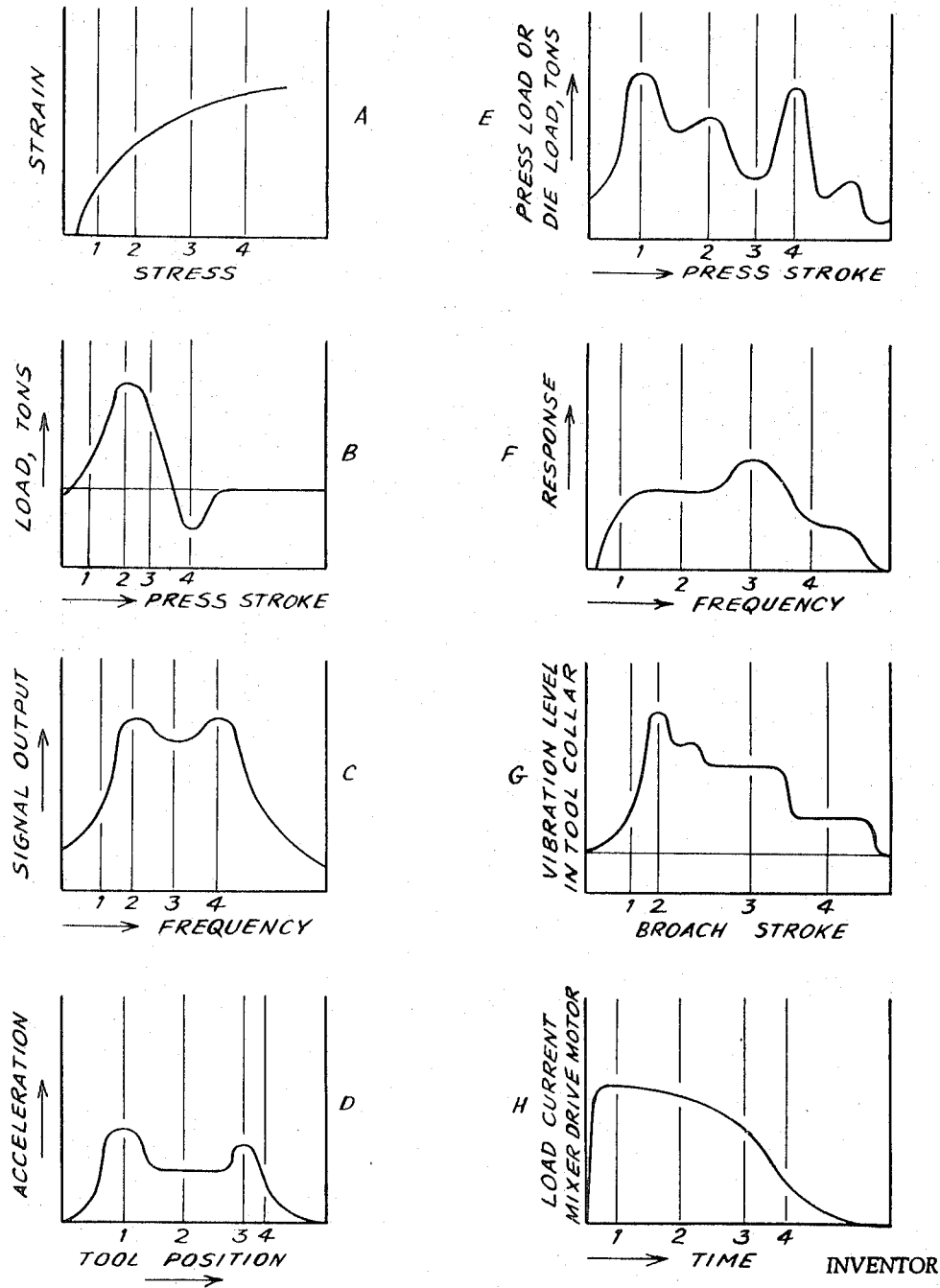

FIGURE 15A shows the relationship of a strain developed in a test specimen versus the stress applied to it. The curve shows that the individual values of $x$ can be set to the positions 1, 2, 3 and 4 so that limit indications will occur as a strain versus stress reaction occurs within a test sample which is not within allowable limits. This application lends itself to the automation of tensile testing machines which are widely employed in the incoming inspection of materials in many industries.

FIGURE 15B shows a curve representing the positive and negative load undergone by a large mechanical press used in metal forming, shearing and extrusion. It is a characteristic of these processes that the press assembly undergoes both positive and negative loading. The negative loading represents the strip-out forces required during the disengagement of the die elements after the completion of the forward work stroke. Normally, the initial onset of failure of large punching dies occurs in excessive strike-out scouring. The position 4 of FIGURE 15B can be applied to monitor this particular part of the operating cycle. Position 2 provides monitoring of the peak positive load developed in the press cycle. Position 1 provides response to changes in the initial load shear rate developed upon the commencement of the positive machine stroke.

FIGURE 15C illustrates an application in which the intermediate frequency band width response of an amplifier strip is being inspected for adherence to allowable limits or deviation from a required standard. In this instance, the 2 and 4 traces represent the proper level of circuit gain. The position 3 indicates the degree of desired "flat-topping" of a central frequency response. The position 1 represents the "Q" of the circuit response.

FIGURE 15D shows an instance of numerical controlled machine work piece cutting in which there is a characteristic change in the work expended by the cutting tool as the position of that tool is automatically directed from one of the work pieces to another point.

In FIGURE 15E, the y signal represents the force (acceleration, velocity or deflection) developed during the sequential engagement of the individual elements of a progressive die set. As a press stroke proceeds, the individual actions of the elements of the die set produce mechanical reaction forces which are separated progressively in time as the die closure proceeds. The position 1 is selected to correspond to some reaction force which characteristically occurs at that particular point in the die closure cycle. In a similar manner, the positions 2, 3 and 4 are selected by means of observation of the characteristic oscilloscope display generated during normal press operation and by positioning the vertical trace lines by means of the position control knob 202 provided in the setter unit 182.

FIGURE 15F shows how the present system may be used to test various elements such as, for example, transducers or microphones which are frequency responsive. Any frequency variations from the desired characteristics are immediately indicated by the present system.

Many machine tool actions exhibit marked changes in the motions existing within a machine as the work piece cycle progresses. One such instance is the operation of a large broach. In the instance of automatic automobile component manufacturing, large broaches are often used which perform progressively not only the rough cutting but also proceed all the way through the final finishing operation in one pass. FIGURE 15G shows a possible consequence of the response of the broach tool to changes in the nature of the cutting being performed by it on the work piece.

FIGURE 15H shows an instance in which the system of the present invention is used to monitor the mixing of materials in a chemical process. In this case, a successful outcome of the mix can be predicted based on the progressive lessening of the drive load current requirements of the mixture motor as the chemical reaction induced by mixing progresses. Such a condition occurs if the mixing operation is inducing a change in the viscosity of the ingredients due to the progress of the reaction. The interval of time represented by the progress through the successive positions 1–4 can be of the order of hours or days if this is appropriate. Should such an extended period of time be desirable, the progress of the function x is controlled by a time-dependent signal generator and its cycle is initiated when the machine or process cycle is initiated.

It is apparent from the above that the present invention provides a novel system for monitoring the operation of automatic machines. While finding easily illustrated utility for use with hydraulic presses the system of the present invention may be utilized in conjunction with all types of machines producing all types of variations in the properties of a work product. Whereas heretofore production monitoring has been limited to product characteristics, the present invention provides a monitoring system which indicates the relationship between the product and machine operating upon it. As a result, it is possible through use of the present invention to reduce machine wear and even to predict in advance possible machine breakdown. Through the use of the standard diagrams and/or present limits correlations can be obtained between diagram characteristics and/or limits and operating characteristics of both the machine and the product being worked. These correlations lead to an understanding of the cause of any faults noted and make it possible to correct the faults before they become extreme and adversely affect the machine. For example, variations such as increased pressure, increased friction and similar machine variations may be sensed at their very inception even during a single cycle of operation, so as to prevent excessive damage to the machines before it actually occurs.

At the same time, it is possible through the system of the present invention to ascertain variations in work blanks such as increased hardness, variations in thickness and so on, so as to rectify the difficulties at the source without varying and possibly adversely affecting other operating characteristics of the machine.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An operation monitor comprising a machine for operating on a plurality of products in time sequence to produce a change in the physical characteristics of the products, an electrical transducer connected to said machine for producing and electrical output signal representative of the function of said machine during a work cycle, means for visually displaying the information contained in said output signal as a waveform trace, photographic means for recording said trace on a photographic print, the center of said trace having different optical transmission properties gradually diminishing as the distance from the centerline of said trace increases, means for incorporating said print on the face of a cathode ray oscilloscope, and means for applying the information contained in a later transducer output signal similarly derived from said machine to the vertical deflection plates of said oscilloscope whereby the differences between said trace and said later signal appear as variations in the amount of light passed by said print.

2. Apparatus according to claim 1 including photosensitive means responsive to variations in the light from said cathode ray oscilloscope, and comparator means coupled to said photosensitive means for comparing said variations to a reference voltage.

3. Apparatus according to claim 2 wherein said comparator means feeds an alarm device to energize an alarm when the voltage variations across said photosensitive means exceeds said reference voltage.

4. An operation monitor comprising a machine for operating on a plurality of products in time sequence to produce a change in the physical characteristics of the product, first and second transducers connected to different portions of said machine for obtaining output signals representative of the operation of said different portions during a work cycle, an oscilloscope, said first transducer being connected to the vertical deflection circuitry of said oscilloscope and said second transducer output being connected to the horizontal deflection circuitry of said osilloscope for visually displaying variations in said first transducer signals as a function of said second transducer signals, photographic means for recording said functional relationship for a particular work cycle during which the desired changes in the physical characteristics of the product is being achieved, function generator means cooperating with said photographic means to reproduce said functional relationship at a later time, and means for comparing the reproduced functional relationship with a later functional relationship derived from said transducer outputs as a measure of the change in the physical characteristics of the products then being produced.

5. Apparatus according to claim 4 wherein said function generator means comprises a cathode ray oscilloscope having a screen mask including a trace representative of the variations in said transducer output, and the spot on said screen follows the trace on said mask.

6. An operation monitor comprising a machine for operating on a plurality of products in a time sequence to produce a change in the physical characteristics of the products, a pair of transducers connected to different portions of said machine for obtaining output signals representative of the operation of said different portions during a work cycle, oscilloscope means for visually displaying variations in one of said transducer signals as a function of the other, photographic means for recording said visual display for a particular work cycle, and a function generator for reproducing said variations from said photographic means at a later time for comparison with a later variation in said one transducer output during a subsequent cycle, said function generator comprising a screen mask attached to said oscilloscope and including a trace representative of the variations in said transducer output during said particular work cycle, and having different light transmitting properties on opposite sides of said trace, photosensitive means responsive to variations in the light from said cathode ray oscilloscope spot transmitted through said mask.

7. Apparatus according to claim 6 wherein the voltage across said photosensitive means is fed back to the vertical deflection plates of said function generator oscilloscope.

References Cited
UNITED STATES PATENTS

| | | | |
|---|---|---|---|
| 2,398,988 | 4/1946 | Ziebolz | 340—213 |
| 2,909,660 | 10/1959 | Alexander | 250—52 |
| 3,186,216 | 6/1965 | Dickinson | 346—110 |
| 3,257,652 | 6/1966 | Foster | 346—107 |

RICHARD B. WILKINSON, *Primary Examiner.*

MICHAEL LORCH, *Assistant Examiner.*